(12) United States Patent
Klingels

(10) Patent No.: US 6,381,948 B1
(45) Date of Patent: May 7, 2002

(54) DRIVING MECHANISM WITH COUNTER-ROTATING ROTORS

(75) Inventor: Hermann Klingels, Eching (DE)

(73) Assignee: MTU Aero Engines GmbH, Munich (DE)

( * ) Notice: Subject to any disclaimer, the term of this patent is extended or adjusted under 35 U.S.C. 154(b) by 0 days.

(21) Appl. No.: 09/720,340

(22) PCT Filed: Jun. 23, 1999

(86) PCT No.: PCT/DE99/01832

§ 371 Date: Jun. 28, 2001

§ 102(e) Date: Jun. 28, 2001

(87) PCT Pub. No.: WO00/00730

PCT Pub. Date: Jan. 6, 2000

(30) Foreign Application Priority Data

Jun. 26, 1998 (DE) .......................................... 198 28 562

(51) Int. Cl.$^7$ ................................................ F02K 3/02
(52) U.S. Cl. ................... 60/226.1; 60/39.162; 416/129
(58) Field of Search .......................... 60/226.1, 39.162; 416/129

(56) References Cited

U.S. PATENT DOCUMENTS

| | | | | | |
|---|---|---|---|---|---|
| 1,330,145 | A | * | 2/1920 | Sherwood | 416/129 |
| 1,879,142 | A | * | 9/1932 | Egan | 416/129 |
| 2,404,767 | A | | 7/1946 | Heppner | |
| 2,584,115 | A | * | 2/1952 | Dinsmoor | 416/129 |
| 3,087,553 | A | * | 4/1963 | Kostyun | 416/129 |
| 4,563,129 | A | * | 1/1986 | Pagluica | 416/129 |
| 4,860,537 | A | | 8/1989 | Taylor | |
| 4,969,325 | A | | 11/1990 | Adamson et al. | |
| 5,010,729 | A | | 4/1991 | Adamson et al. | |
| 5,079,916 | A | * | 1/1992 | Johnson | 60/268 |
| 5,274,999 | A | * | 1/1994 | Rohra | |

* cited by examiner

Primary Examiner—Charles G. Freay
Assistant Examiner—Ehud Gartenberg
(74) Attorney, Agent, or Firm—Crowell & Moring LLP

(57) ABSTRACT

An engine with counter-rotating rotors, which are coaxially arranged and are driven via a shaft by a turbine whose working medium is supplied by a gas generator with an air inlet, the air inlet (3) being arranged between (in the axial direction) the rotors (1, 2) in order to reduce the noise annoyance (FIG. 1), the rotors driven by an epicyclic gear, the internal gearwheel driving the rear rotor the plant carrier driving the front rotor.

23 Claims, 1 Drawing Sheet

DRIVING MECHANISM WITH COUNTER-ROTATING ROTORS

Figure 1:
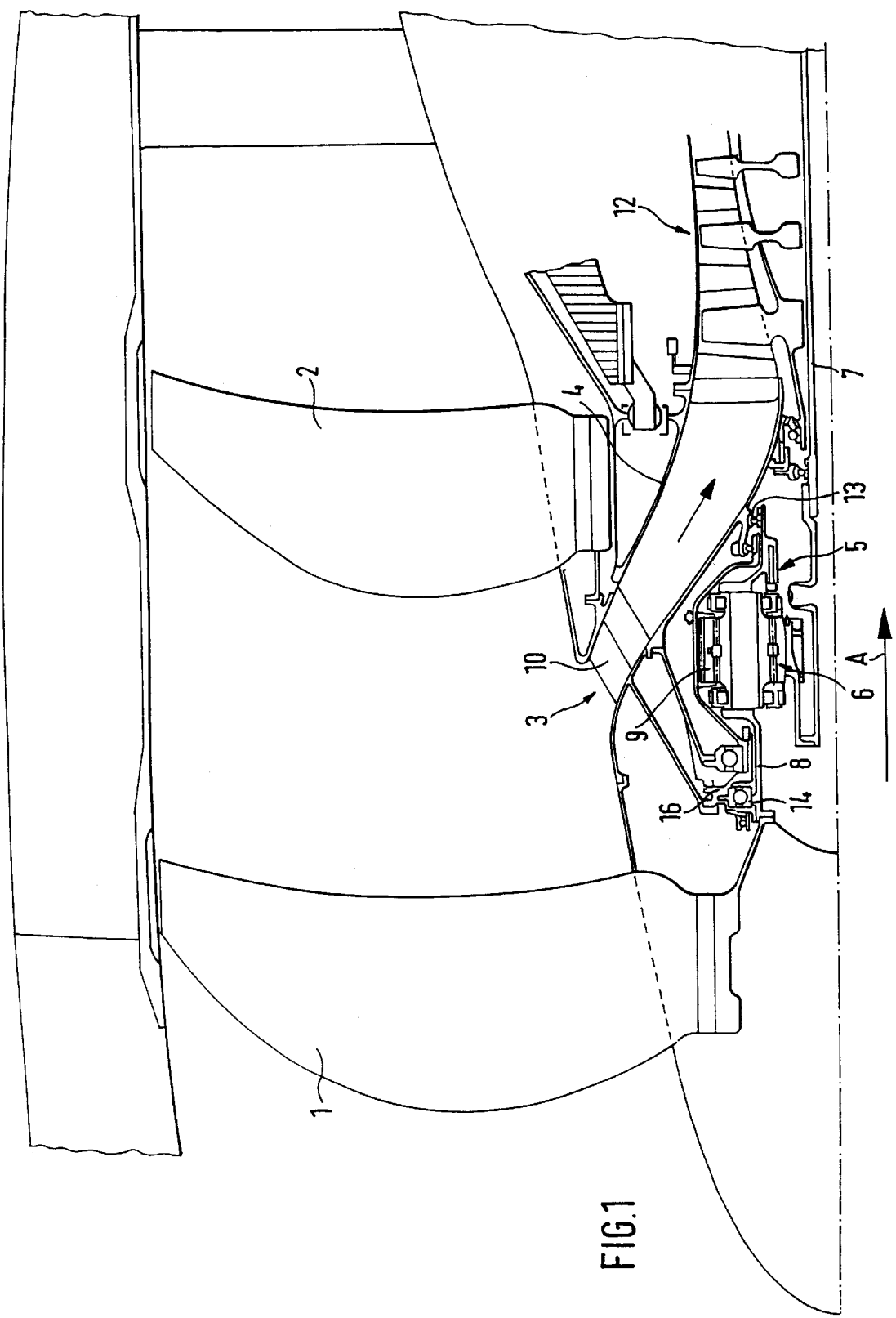

The invention relates to an engine with counter-rotating rotors, which are coaxially arranged and are driven via a shaft by a turbine whose working medium is supplied by a gas generator with an air inlet.

In engines with counter-rotating rotors or propellers, the air inlet for the gas generator or the core engine is arranged either before or after the rotors. In known engines, in which the air inlet is arranged before (in the axial direction) the rotors, the rotors are arranged coaxially in the region of the low-pressure turbine, one rotor being connected to the rotating low-pressure turbine stator and the other to the low-pressure turbine rotor.

In other known engines, in which the core engine is arranged with its air inlet behind the rotors, the rotors are generally driven via a gear by a high-speed low-pressure turbine. The rotors are supported in the engine casing by a floating bearing arrangement, one of the rotors being supported on the other. A problematic feature is that in the case of engines with counter-rotating rotors, low noise figures can only be achieved when the axial distance between the rotors is relatively large. In the case of a large distance between the rotors, however, their floating bearing arrangement leads to mechanically unfavorable designs, which are difficult to deal with, because all the forces generated by the rotors must, furthermore, be conducted via the casing into the engine suspension. In addition, a construction based on rotors arranged at a large axial distance from one another and on an engine air inlet located behind them leads to a long and heavy construction, in which the position of the center of gravity of the engine is displaced in a manner unfavorable to its installation.

A gas turbine engine is known from U.S. Pat. No. 4,860,537 in which an air inlet is arranged between two counter-rotating fan rotors. The fan rotors are directly coupled to a turbine and are driven by two separate drive shafts. A disadvantageous feature of this arrangement is that two shafts have to be led through the core engine. Because of the low rotational speed of the fan rotors, this involves slowly rotating shafts, which have a large diameter in order to be able to transmit the high torques.

The fan engine revealed in U.S. Pat. No. 5,010,729 has a fan rotor with an air inlet arranged axially behind it for the core engine, the fan rotor being driven by two counter-rotating shafts via two gears whose internal gearwheels are fixed to the casing.

The invention is based on the object of improving an engine, of the generic type described at the beginning, in such a way that the noise annoyance due to the rotors is kept low in association with the smallest possible axial installation length.

This object is achieved, in accordance with the invention, by the characterizing features of claim 1.

This arrangement of the air inlet or the suction opening makes it possible to arrange the support bearing of the rotors in the vicinity of their centers of gravity even in the case of a large axial distance between the rotors. For further noise reduction, the axial distance between the rotors can, in addition, be increased without difficulty without disadvantages appearing with respect to the mechanical loads on the engine.

In a preferred embodiment, a (support) casing of the rotors is arranged in the drive shaft of the rear (in the axial direction) rotor.

Both bearings of the rear rotor and the floating bearing of the front rotor are preferably arranged in the (support) casing and the fixed bearing of the front rotor is preferably arranged as an intermediate shaft bearing on the shaft of the rear rotor.

It is advantageous for the rear rotor to be driven by a rotating cascade arranged in the air inlet opening, this cascade being preferably designed in such a way that the swirl generated in the airflow by the front rotor is essentially cancelled out. This achieves the effect that the flow into the casing is swirl-free.

Maximum preference is given to the single internal gearwheel of the gear being supported in the (support) casing.

The planet carrier is preferably arranged in the drive shaft of the rear rotor.

Further embodiments of the invention are described in the sub-claims.

The invention is explained in more detail below with reference to a drawing, using an embodiment example. FIG. 1 shows a view of an engine, which view is limited to the part which is essential to the invention and in which is shown, in longitudinal section, an embodiment example of the engine according to the invention with counter-rotating rotors.

FIG. 1 shows a front rotor 1 and a rear rotor 2, front and rear in the axial direction A, so that an airflow entering the engine first meets the front rotor 1 and subsequently meets the rear rotor 2. A suction opening or an air inlet 3, through which the induced air is guided through a casing 4 of the engine to a gas generator (designated in total by 12 and not described in any more detail), is arranged between the two rotors 1 and 2. The gas generator 12 is located in the region of the rear rotor 2 or behind it, in the axial direction A. The air inlet 3 extends essentially tangentially to the hub contour so that it is protected from the entry of foreign bodies.

The two rotors 1 and 2 are driven by an epicyclic differential gear, which is designated in total by 5 and whose sun wheel 6 is connected to a low-pressure turbine shaft 7, which do is in turn driven by a low-pressure turbine which is driven by working gas from the gas generator 12. The epicyclic differential gear 5 comprises, in addition to the sun wheel 6, an orbiting planet carrier 8 and an internal gearwheel 9. The internal gearwheel 9 drives the rear rotor 2 via a rotating cascade 10, which is located in the air inlet 3. The cascade 10 is designed in such a way that the swirl generated by the front rotor 1 in the airflow entering the engine is essentially cancelled out so that the flow into the casing 4 is essentially swirl-free.

The internal gearwheel 9 is supported in a support casing 4, by which means a compact and short engine construction is achieved. The orbiting planet carrier 8 of the epicyclic differential gear 5 is supported by its floating bearing 13 on the casing 4 and by its fixed bearing 14 which is arranged as an intermediate shaft bearing in a drive shaft 16 of the rear rotor 2, and drives the front rotor 1.

The integration of the gear 5 in the hub or drive shaft 16 of the rear rotor 2, together with the present arrangement of the two rotors 1 and 2, on the one hand, and of the air inlet 3, on the other, permits the achievement of a short and compact construction in the axial direction A. For further noise reduction, the two rotors 1 and 2 can be moved further from one another in the axial direction A without this having disadvantageous effects on their support in the casing 4 and on the mechanical loading on the engine.

What is claimed is:

1. Engine with counter-rotating rotors, which are coaxially arranged and are driven via a shaft by a turbine whose working medium is supplied by a gas generator with an air inlet arranged between—in the axial direction—the rotors, wherein the rotors are driven by a low-pressure turbine shaft via an epicyclic differential gear, the internal gearwheel of the gear driving the rear rotor and the planet carrier of the gear driving the front rotor.

2. Engine according to claim 1, wherein a casing of the rotors is arranged in the drive shaft of the rear rotor.

3. Engine according to claim 2, wherein both bearings of the rear rotor and the floating bearing of the front rotor are arranged in the casing.

4. Engine according to claim 3, wherein the fixed bearing of the front rotor is arranged as an intermediate shaft bearing on the drive shaft of the rear rotor.

5. Engine according to claim 1, wherein the rear rotor is driven by a rotating cascade arranged in the air inlet.

6. Engine according to claim 2, wherein the rear rotor is driven by a rotating cascade arranged in the air inlet.

7. Engine according to claim 3, wherein the rear rotor is driven by a rotating cascade arranged in the air inlet.

8. Engine according to claim 4, wherein the rear rotor is driven by a rotating cascade arranged in the air inlet.

9. Engine according to claim 5, wherein the cascade is designed in such a way that a swirl generated in the flow by the front rotor is essentially cancelled out.

10. Engine according to claim 6, wherein the cascade is designed in such a way that a swirl generated in the flow by the front rotor is essentially cancelled out.

11. Engine according to claim 7, wherein the cascade is designed in such a way that a swirl generated in the flow by the front rotor is essentially cancelled out.

12. Engine according to claim 8, wherein the cascade is designed in such a way that a swirl generated in the flow by the front rotor is essentially cancelled out.

13. Engine according to claim 2, wherein the internal gearwheel of the gear is supported in the casing.

14. Engine according to claim 3, wherein the internal gearwheel of the gear is supported in the casing.

15. Engine according to claim 4, wherein the internal gearwheel of the gear is supported in the casing.

16. Engine according to claim 5, wherein the internal gearwheel of the gear is supported in the casing.

17. Engine according to claim 9, wherein the internal gearwheel of the gear is supported in the casing.

18. Engine according to claim 2, wherein the planet carrier is arranged in the drive shaft of the rear rotor and in the casing.

19. Engine according to claim 3, wherein the planet carrier is arranged in the drive shaft of the rear rotor and in the casing.

20. Engine according to claim 4, wherein the planet carrier is arranged in the drive shaft of the rear rotor and in the casing.

21. Engine according to claim 5, wherein the planet carrier is arranged in the drive shaft of the rear rotor and in the casing.

22. Engine according to claim 9, wherein the planet carrier is arranged in the drive shaft of the rear rotor and in the casing.

23. Engine according to claim 13, wherein the planet carrier is arranged in the drive shaft of the rear rotor and in the casing.

* * * * *